(12) United States Patent
Frankiewicz et al.

(10) Patent No.: US 7,157,007 B2
(45) Date of Patent: Jan. 2, 2007

(54) VERTICAL GAS INDUCED FLOTATION CELL

(75) Inventors: Theodore C. Frankiewicz, Sugar Lane, TX (US); Chang-Ming Lee, Houston, TX (US)

(73) Assignee: National Tank Company, Houston, TX (US)

( * ) Notice: Subject to any disclaimer, the term of this patent is extended or adjusted under 35 U.S.C. 154(b) by 403 days.

(21) Appl. No.: 10/600,469

(22) Filed: Jun. 20, 2003

(65) Prior Publication Data

US 2004/0256325 A1    Dec. 23, 2004

(51) Int. Cl.
*C02F 1/24* (2006.01)

(52) U.S. Cl. .................. 210/703; 210/708; 210/718; 210/712; 95/253; 95/261

(58) Field of Classification Search ............... 210/703, 210/712, 708, 718; 95/253, 261
See application file for complete search history.

(56) References Cited

U.S. PATENT DOCUMENTS

| | | | | |
|---|---|---|---|---|
| 2,047,989 A | * | 7/1936 | Woelflin .................. 516/139 |
| 2,695,710 A | * | 11/1954 | Gibbs ...................... 210/197 |
| 2,730,190 A | * | 1/1956 | Brown et al. .............. 95/253 |
| 2,730,240 A | * | 1/1956 | Johnson .................... 208/188 |
| 3,182,799 A | | 5/1965 | Krofta |
| 3,754,656 A | | 8/1973 | Horiguchi et al. ......... 210/221 |
| 3,932,282 A | * | 1/1976 | Ettelt ...................... 210/195.1 |
| 4,094,783 A | * | 6/1978 | Jackson .................... 210/703 |
| 4,231,867 A | | 11/1980 | Sutphin .................... 210/703 |
| 4,246,112 A | | 1/1981 | Mausgrover ............... 210/104 |
| 4,253,965 A | | 3/1981 | Pielkenrood .............. 210/519 |
| 4,255,262 A | | 3/1981 | O'Cheskey et al. ...... 210/221.2 |
| 4,377,485 A | | 3/1983 | Krofta ..................... 210/704 |
| 4,564,457 A | | 1/1986 | Cairo, Jr. et al. ......... 210/704 |
| 4,627,922 A | * | 12/1986 | Viator et al. ............. 210/704 |
| 4,782,789 A | | 11/1988 | Canzoneri ................ 210/703 |
| 4,800,025 A | | 1/1989 | Bibaeff .................... 210/703 |
| 5,011,597 A | | 4/1991 | Canzoneri |
| 5,021,165 A | | 6/1991 | Kalnins |
| 5,080,802 A | * | 1/1992 | Cairo et al. .............. 210/703 |
| 5,156,745 A | | 10/1992 | Cairo, Jr. et al. ........ 210/703 |

(Continued)

FOREIGN PATENT DOCUMENTS

EP    1 400 492    3/2004

(Continued)

OTHER PUBLICATIONS

Copy of International Search Report from Corresponding Application PCT/US04/19563 dated Nov. 4, 2004.

*Primary Examiner*—Thomas M. Lithgow
(74) *Attorney, Agent, or Firm*—Gable Gotwals (57) ABSTRACT

A system for separating oil and/or oily coated solids from an oily water mixture. The system includes an upright vessel having an inlet for introducing oily water in a horizontal pattern. The vessel also has a water outlet in a lower portion of the vessel and an oil outlet. An eductor is positioned within a lower portion of the vessel and is arranged to disseminates small gas bubbles in a radial, substantially horizontal pattern and substantially uniformly over the full cross-sectional area of the vessel. The bubbles migrate upwardly against the downward flow of oily water within the vessel and attach to oil droplets and/or oily coated solids augmenting the buoyancy thereof, and thereby enhancing oily contaminant separation from water. A two-stage oil skimmer bucket is located in a top portion of the vessel by which separated oil is collected and discharged through the oil outlet.

17 Claims, 9 Drawing Sheets

U.S. PATENT DOCUMENTS

| | | |
|---|---|---|
| 5,300,222 A | 4/1994 | Broussard, Sr. .............. 210/202 |
| 5,320,750 A | 6/1994 | Krofta ..................... 210/221.2 |
| 5,407,584 A | 4/1995 | Broussard |
| 5,492,622 A * | 2/1996 | Broussard ................... 210/202 |
| 5,516,434 A | 5/1996 | Cairo, Jr. et al. ........... 210/703 |
| 5,584,995 A * | 12/1996 | Meekel et al. ........... 210/221.2 |
| 5,656,173 A | 8/1997 | Jordan et al. ............... 210/703 |
| 5,814,228 A * | 9/1998 | Hubred et al. .............. 210/703 |
| 6,337,023 B1 * | 1/2002 | Broussard et al. .......... 210/703 |
| 6,749,757 B1 * | 6/2004 | Smith et al. ................ 210/703 |

FOREIGN PATENT DOCUMENTS

| | | | |
|---|---|---|---|
| GB | 2263694 | * | 8/1993 |

* cited by examiner

VERTICAL GAS INDUCED FLOTATION CELL

REFERENCE TO PENDING APPLICATIONS

This application is not based upon any pending domestic or international patent applications.

REFERENCE TO MICROFICHE APPENDIX

This application is not referenced in any microfiche appendix.

FIELD OF THE INVENTION

The present invention relates to a method and apparatus for removing immiscible matter from liquid, particularly for separating oil and/or oil-coated solids from oily water. For purposes of disclosing the present invention, "oily water" will refer to any water that is contaminated by dispersed oil droplets, oil-coated solids, or other hydrophobic contaminants.

DESCRIPTION OF THE RELATED ART

In many industries, including oil, paper and pulp, textiles, food processing, etc., there is an ever-present problem of contaminated water as a by-product of various processes. In particular, water is inevitably associated with the production of crude oil —that is, substantially all crude oil produced from subterranean formations of the earth has water associated with it. As a result, the water becomes contaminated with oil and solids and becomes a problem since contaminated water cannot be disposed of by simply dumping it into the environment. Accordingly, numerous methods and systems have been devised to reduce the contaminant content of water to a level which can permit its discharge into the environment without any deleterious consequences.

The basic method of separating a mixture of oil and water is by use of gravity. For this purpose, separators are frequently employed at the point where the crude oil first reaches the earth's surface. These separators are generally unsophisticated pieces of apparatus that simply provide an enclosed container wherein the mixture can rest with reduced turbulence to thereby allow the oil to float to an upper part of the vessel and water to settle to a lower part of a vessel—the oil and water being separately discharged. This fundamental system functions successfully as a beginning point to separate a mixture into oil and water but much more is required to meet today's standards of environmental protection. Therefore, much research has been done to improve the extraction of oil from oily water. One system that has been successfully employed in a wide variety of different treating vessels is the use of flotation. Simply stated, flotation includes dispersing gas in the form of fine bubbles into the mixture. As the gas bubbles rise upwardly, they associate with oil droplets or other hydrophobic contaminants to cause the contaminants to rise to the surface of the water. In some systems, gas (such as air or gas derived from the mixture itself) is injected directly into a lower portion of the vessel to disperse within the vessel and to thereby assist in the flotation of contaminants. However, a more preferred system is to employ a dispersion of fine gas bubbles in water that is introduced into the flotation vessel.

Major factors that impact the efficiency of a flotation process are: (1) oil droplet/contaminant diameter; (2) gas bubble diameters; and (3) true liquid residence time in a flotation cell. Generally, as gas bubble diameters decrease—that is, become smaller, the efficiency of the flotation process increases. However, there is always a trade-off in that for flotation to be practiced in a practical manner the bubbles must be sufficiently large to overcome any downward fluid velocity in the flotation cell. Thus, for a vertical column flotation cell with, as an example, a net average downward water velocity of two ft/min, a gas bubble will need to have a diameter greater than about 100 microns in order to retain a net upward movement in the cell based upon Stokes Law.

After gas bubbles are dispersed into a flotation cell, they will increase in size due to bubble-bubble coalescence and due to the reduction in pressure from the static liquid head experienced as the bubbles rise towards the surface of the liquid column.

BACKGROUND OF THE INVENTION

Prior art examples illustrating the application of a flotation process for augmenting the separation of an oil/water mixture are as follows:

| PAT. NO. | INVENTOR(S) | TITLE |
| --- | --- | --- |
| 3,182,799 | Krofta | Method And An Apparatus For Purifying The Unclarified Waste Water In The Paper And Pulp And Like Industries |
| 3,754,656 | Horiguchi et al. | Flotation Separators |
| 4,231,867 | Sutphin | Method And Apparatus For Treating Heterogeneous Fluid Systems |
| 4,246,112 | Mausgrover | Oil-Water Separator Having Means For Conditioning The Water For Reuse |
| 4,253,965 | Pielkenrood | Purification Device |
| 4,255,262 | O'Cheskey et al. | Hydraulic Powered Mixing Apparatus |
| 4,377,485 | Krofta | Apparatus And Method For Clarification Of Water Using Combined Flotation And Filtration Processes |
| 4,564,457 | Cairo, Jr. et al. | Upflow Gas Eductor Induced Air Flotation Separator |
| 4,782,789 | Canzoneri | Induced Static Flotation Cell |
| 4,800,025 | Bibaeff | Apparatus And Process For The Gas Flotation Purification Of Oil-Contaminated Water |
| 5,080,802 | Cairo, Jr. et al | Induced Gas Liquid Coalescer And Flotation Separator |
| 5,156,745 | Cairo, Jr. et al | Induced Gas Liquid Coalescer And Flotation Separator |
| 5,300,222 | Broussard, Sr. | Water Clarification Method And Apparatus |
| 5,320,750 | Krofta | Water Clarifier With First Filtrate Isolation, Improved Backwashing And Improved Bubble Generation |
| 5,516,434 | Cairo, Jr. et al. | Single Cell Gas Flotation Separator With Filter Media |
| 5,656,173 | Jordan et al. | Method Of Removing Dispersed Oil From An Oil In Water Mixture Employing Aerated Solutions Within A Coalescing Media |

BRIEF SUMMARY OF THE INVENTION

This invention provides a system for separating oil from an oily water mixture including an upright vessel having an inlet for introducing oily water into an upper interior portion of the vessel, a clean water outlet in a lower portion of the vessel and an oil collection bucket or equivalent connected to an oil outlet. An eductor is positioned within a lower portion of the vessel, the eductor having a liquid inlet, gas inlet and an aerated water solution outlet arranged to disseminate small gas bubbles in a radial horizontal pattern substantially uniformly over the full cross-sectional area of the vessel, the bubbles migrating upwardly against the downward flow of oily water. The gas bubbles attach to oil droplets to augment the buoyancy thereof, thereby enhancing oil/water separation. For the present discussion, "aerated water" shall refer to a mixture of water with small gas bubbles wherein the gas may be air natural gas, nitrogen, or other suitable gas.

An oil skim bucket is positioned near the top of the vessel by which separated oil is collected and discharged through the oil outlet.

In a preferred embodiment of the invention, the oily water mixture inlet system includes a vertical cylinder in which the oily water mixture enters tangentially. The vertical inlet cylinder is positioned concentrically within the upper portion of the vessel. Cyclonic action within the inlet cylinder grossly separates gas from the mixture, the gas passing out an upper opening of the inlet cylinder and the oily water mixture flows out horizontally in a circular motion from a lower portion. The horizontally directed circular flow discharging from the inlet cylinder distributes the oily water mixture uniformly within the cell so that as the oily water mixture moves downwardly within the cell, oil droplets dispersed therein effectively interact with the upwardly flowing small gas bubbles to achieve an effective flotation separation.

The vertical induced gas flotation cell of the present invention incorporates the following primary features:

(1) Uniform downward flow of oily water through the cell with rising gas bubbles substantially in uniform distribution over the cross-sectional area of the cell;

(2) An eductor that uniformly disperses gas bubbles over the full cross-sectional area of a lower portion of the cell, the gas bubbles being of a size such that their rise velocity exceeds the downward velocity of the water in the cell, the eductor having the capability of introducing sufficient gas into the cell so that effective flotation is obtained;

(3) The cell includes a main flotation section with a preferred downward plug flow of water at a preferred net average velocity of about two ft/min;

(4). A total, liquid residence time in the cell that is typically between two and six minutes;

(5) An inlet system that separates gas slugs from the oil/water mixture inflow, pre-coalesces oil, droplets in the inlet mixture, and imparts a cyclonic motion to the mixture in the upper, entrance section of the main chamber of the flotation cell;

(6) A horizontal coalescing section over the full cross-sectional area of the cell that resists plugging by oil-coated solids and that assists both with the coalescence of oil droplets in the mixture and also with uniformly distributing the downward flow of the mixture over the cross-sectional area of the cell;

(7) A water discharge configuration that draws water uniformly from a full cross-sectional area of the cell;

(8) An oil skim bucket having a front weir that is protected from excess flow of rising gas bubbles up the face of the weir;

(9) An eductor system that mixes gas with recirculated water extracted from the flotation cell to effectively generate small bubble sizes and that discharges aerated water into a lower portion of the flotation cell in a circumferential horizontal pattern to evenly distribute small gas bubbles over the cross-sectional area of the flotation cell.

A particularly unique concept of the present invention is a flotation cell having an inlet system that subjects an incoming oily water mixture to cyclonic action to initially cause a gross separation of large entrained gas bubbles from the mixture and then discharges the separated oily water mixture into the cell in a substantially horizontal circular flow pattern for more effective and complete distribution over the full cross-sectional area and, concomitantly, a system for introducing finely dispersed gas bubbles from aerated water into a lower portion of the cell in a horizontal discharge pattern that more effectively distributes the gas bubbles within the cross-sectional area of the cell so that gas bubbles that rise upwardly from the aerated water are intimately and uniformly mixed with downward flow of the oily water mixture, thus effectively creating an environment in which small gas bubbles adhere to oil droplets and other hydrophobic contaminants to induce separation of the entrained oil and other hydrophobic contaminants.

A better understanding of the invention will be obtained from the following description and claims taken in conjunction with the attached drawings.

BRIEF DESCRIPTION OF THE DRAWINGS

FIGS. 10 and 11 are intended to illustrate examples of various coalescing mediums that may be employed.

DETAILED DESCRIPTION OF THE PREFERRED EMBODIMENTS

Figure 1:
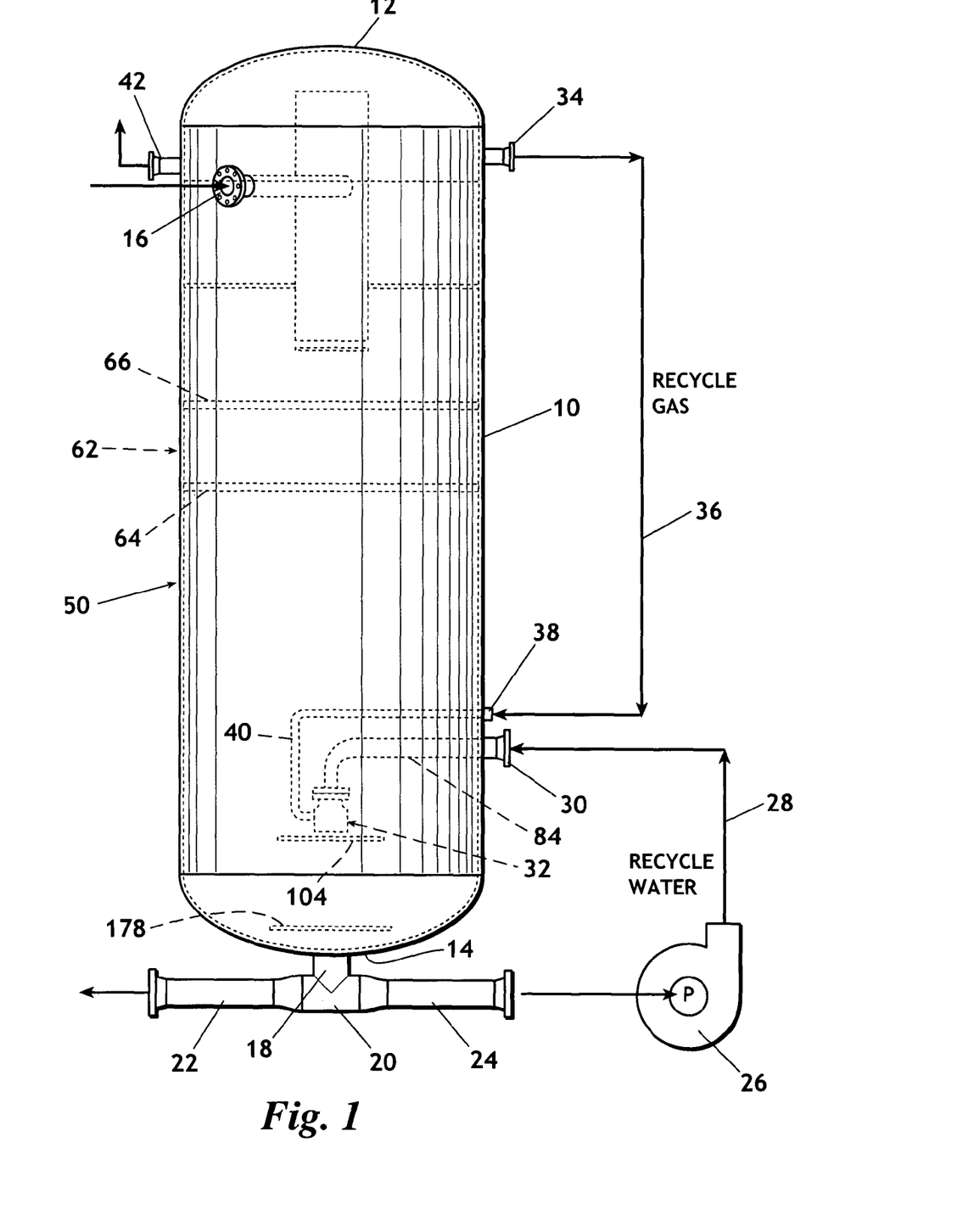
FIG. 1 is an elevational external view of a vertical gas induced flotation cell that incorporates the principles of this invention.

FIG. 1 illustrates an embodiment of a flotation cell system in which the major component thereof is a vessel 10. Vessel 10 which may also be referred to as a "flotation cell" or simply a "cell", is preferably cylindrical, preferably elongated and preferably vertical. These are the preferred arrangements, however the essence of the invention herein is not limited to an upright cylindrical elongated vessel 10 as illustrated, but this is the much preferred embodiment. The essence of the invention herein could be practiced in other shaped vessels, but to do so would probably result in decreased effectiveness, but not necessarily avoidance of the principles of the invention.

Vessel 10 has a top end 12 and a bottom end 14. Adjacent to top 12 is an oily water mixture inlet 16. The term "mixture" is used to mean that the liquid component flowing into vessel 10 is a mixture of oil, oil-coated solids, and/or other hydrophobic contaminants as previously, described and water and may be typically referred to as "oily water". The mixture may include in addition to oil and water, oil-coated solids, and/or other hydrophobic contaminants. The flotation cell described herein augments separation of oil-coated solids in the same way that oil droplets are separated from the mixture. The inlet liquid may be essentially water having a small quantity of oil entrained therein. The quantity of oil entrained may be small, however the function of the system of this invention is to reduce the oil content of the discharge water substantially, such as to reduce the oil content to below the maximum that can be discharged directly into the environment or at least to reduce the oil content for other purposes. Therefore, while in the typical application of the invention the inlet liquid will be essentially water having some oil contaminant, it is referred to in this description as a "mixture" to indicate that the inlet liquid is not only water, but is water having some entrained immiscible component such as oil and also, in many cases, gas bubbles that arrive with the oily water. Some of these bubbles may be large and disruptive to the flotation process. These large bubbles are removed from the oily water by the cyclonic inlet system that will be described.

At the lower end 14 of vessel 10 is a discharge outlet 18 through which liquid, being typically water having substantially all entrained oil removed therefrom, exits the vessel.

Affixed to discharge outlet 18 is a tee or branch fitting 20 having one end connected to a water discharge pipe 22 that carries clean water away from vessel 10. By "clean water" is meant water having a substantial portion of the original entrained oil contaminate removed. It does not necessarily mean water that is completely pure or that it does not have a small amount of entrained oil component. Also extending from tee fitting 20 is a recirculation conduit 24 that extends to the inlet of a pump 26 that may be such as a centrifugal pump. The outlet of pump 26 connects to a pipe 28 that, in turn is connected to a recycled water inlet 30. Water entering recycled inlet 30 is employed in an eductor system generally indicated by numeral 32 that will be described in details subsequently.

Adjacent the top end 12 of vessel 10 is a recycled gas outlet 34 that connects by a pipe 36 to a gas inlet 38. Gas from gas inlet 38 is carried by a pipe 40 positioned within the interior of vessel 10 to the inductor 32, all in a system to be described subsequently.

Excess gas that accumulates within vessel 10 is removed through a vent gas outlet 42.

Figure 2A:
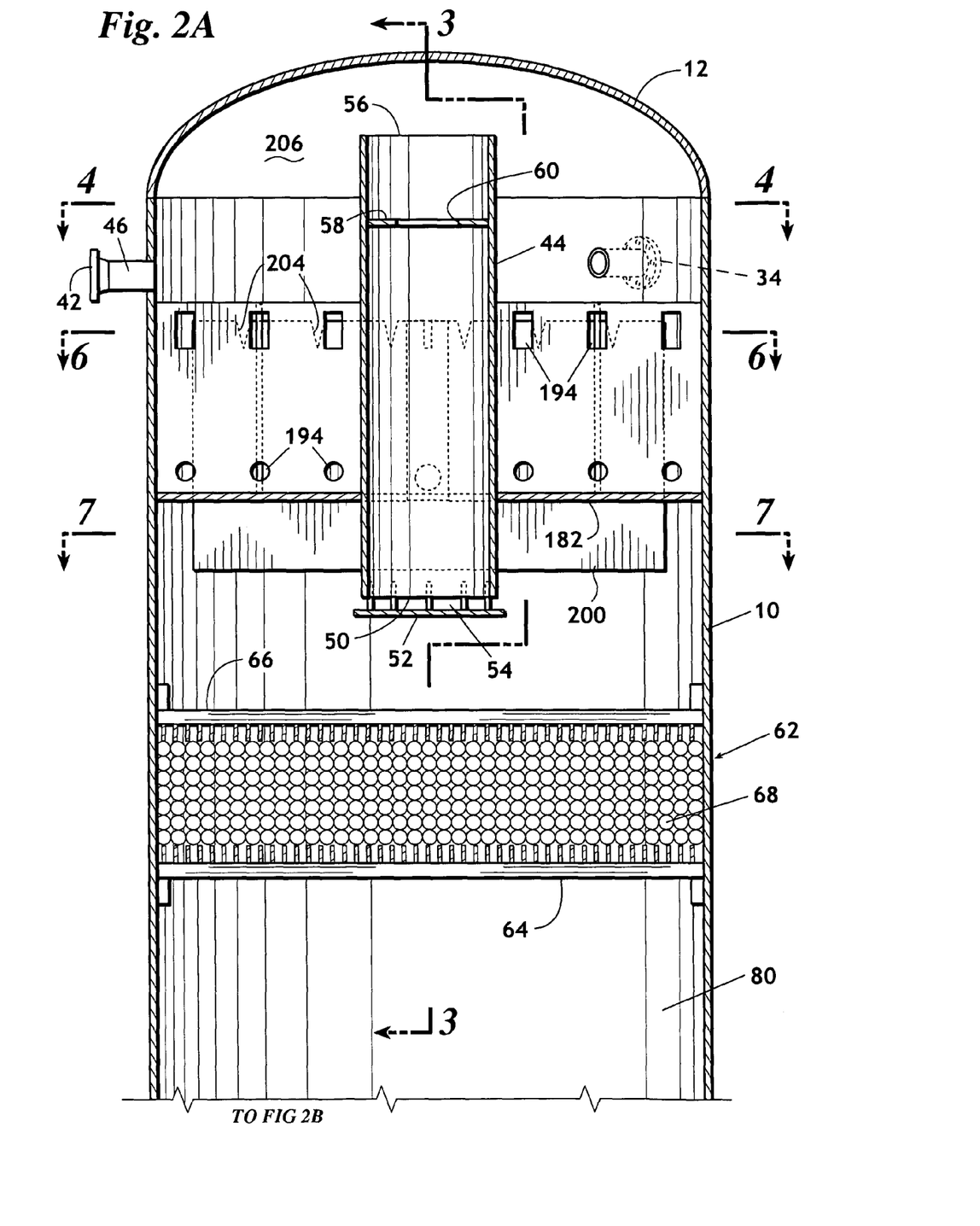
FIG. 2A is an enlarged fragmentary upper cross-sectional view of the gas flotation cell of FIG. 1.

More details of the vessel 10 including the internal components are illustrated in the vertical cross-sectional views 2A, 2B, 3 and 5 and in the horizontal cross-sectional views 4 and 6 through 8. Referring first to FIGS. 2A and 3, the inlet system by which the oily water mixture is introduced into the interior of the vessel is illustrated. Centrally positioned within an upper portion 12 of the vessel is a vertical cylinder 44 that is in the form of an upright tubular member that receives a tangential inlet pipe 46 as best seen in FIGS. 3 and 4. Inlet fluid passing through mixture inlet 16 and inlet pipe 46 enters tangentially into the interior of cylinder 44 resulting in a cyclonic motion of the inlet fluid that causes the heavier component—that is, the oily water component and small gas bubbles to migrate to the outside of the rotating fluid column and the lighter component—that is, large gas bubbles to migrate towards the interior. The essentially heavier component—that is, the oily water and small bubble component, moves downwardly in a column adjacent the internal surface 48 of cylinder 44 to exit the lower end 50. A horizontal bottom plate 52 is spaced below the cylinder lower end 50 to create a circumferential outlet opening 54 through which the heavier component of the inlet mixture emerges horizontally with a circular motion. The function of plate 52 is to retain the vortex formed within the cylinder from exiting the bottom end 50, however plate 52 further functions to cause circumferential radial distribution of the inlet fluid into the interior of vessel 10. The lighter component of the inlet mixture, consisting essentially of gas, moves out the upper top end 56 of the cylinder. A plate 58 placed interiorly of cylinder 44 has a central opening 60 through which gas moves upwardly and out of the hydrocyclone into the interior upper end of vessel 10.

The cylindrical inlet device 44 serves to rapidly separate large gas bubbles and slugs of gas that accompany the mixture to cell 10. The cylindrical inlet device is specifically sized and designed to function to separate large gas bubbles that would be disruptive to flotation but to retain small gas bubbles in the mixture that contribute to the flotation process. Inlet cylinder 44 also acts as a pre-coalesce for oil droplets in the mixture as oil droplets being lighter than water will migrate to and concentrate near the center of the vortex where they can readily coalesce into larger oil droplets that are easier to remove by flotation.

In summary, when the mixture enters cylinder 44 it does so tangentially as can be seen from FIG. 4 so that the mixture swirls within the cylinder separating out large gas bubbles that exit through opening 60 in plate 58 and passes out through the open upper end 56 of the cylinder. The liquid component of the incoming mixture flows out the lower end 50 of the cylinder through circumferential outlet 54. This arrangement imparts a modest swirl to the mixture as it is discharged into the interior of cell 10. This radial, swirling discharge results in an even distribution of the inlet mixture into the upper portion of induced gas flotation cell 10.

Cylindrical inlet device 44 is preferably mounted in the geometric center of the cell 10. Feed pipe 46 is preferably sized to allow the mixture to flow into the cylinder as a gas/liquid stratified flow stream. The velocity of the incoming mixture and the diameter of cylinder 44 are preferably set to subject the incoming mixture to a G-force in the range of about 5 to 50 G's, with 15 to 30 G's being a preferred range. The centrifugal flow of the mixture within cylinder 44 allows rapid separation of large gas bubbles—that is, bubble of diameters of more than one mm (1000 microns). The liquid component of the mixture exits through the circumferential slot 54 formed by solid plate 52. The height of slot 54 is selected to provide an exit velocity sufficient to distribute the mixture over the entire cross-sectional area of cell 10. A typical slot area will be 15 to 50% of the cross-sectional area of cylinder 44 with 25 to 35% being a preferred range.

Gas exits the upper end 56 of the cyclonic inlet through opening 60 as above-stated in which the diameter of the opening 60 is about one half that of the shell of cylinder 44. The diameter of opening 60 should be sufficient that gas is discharged without creating a significant back pressure on the fluid within the cylinder and the geometry of the cylinder is selected so the gas that migrates towards the center of the cyclone by cyclonic action does not escape through the lower slot 54.

Figure 10:
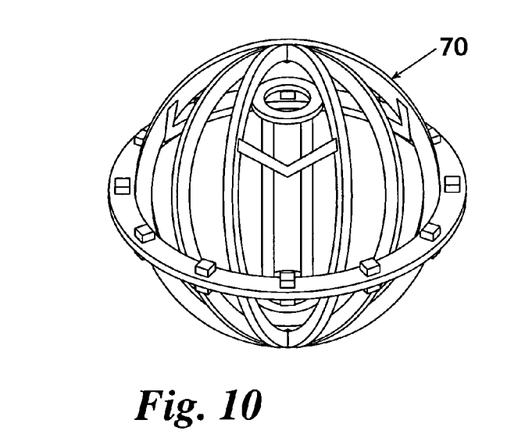
FIG. 10 is an enlarged external view of a typical ball-like member that is used to augment coalescence of suspended oil droplets. The element of FIG. 10 is representative of the small ball-like structures as illustrated in FIG. 7.
Figure 11:
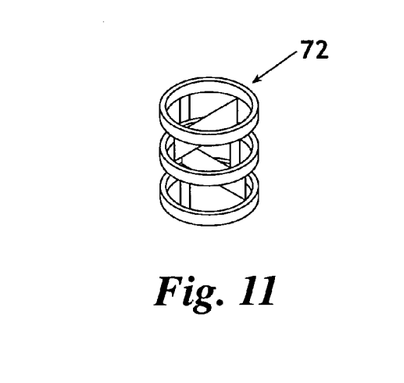
FIG. 11 is a reduced scale external isometric view of a different type of coalescing member that may be employed in the invention.

Positioned below the inlet cylinder 44 but still within an upper interior portion of vessel 10 is a coalescence section generally indicated by the numeral 62. The coalescence section 62 is formed by a lower perforated plate or retaining grid 64 and spaced above it an upper perforated plate or retaining grid 66. Positioned between upper and lower perforated plates or grids 64 and 66 is a coalescing bed that acts to coalesce free oil droplets in the downwardly flowing mixture. This coalescence bed 68 is formed of material that has a high surface area to volume ratio, preferably as random packed material such as NATCO-LESCER (a trademark of the National Tank Company) balls or the equivalent. FIGS. 10 and 11 are isometric views of devices formed of plastic material, and preferably plastic that is oleophilic, that can be used to form coalescence bed 68.

Figures 12, 13:
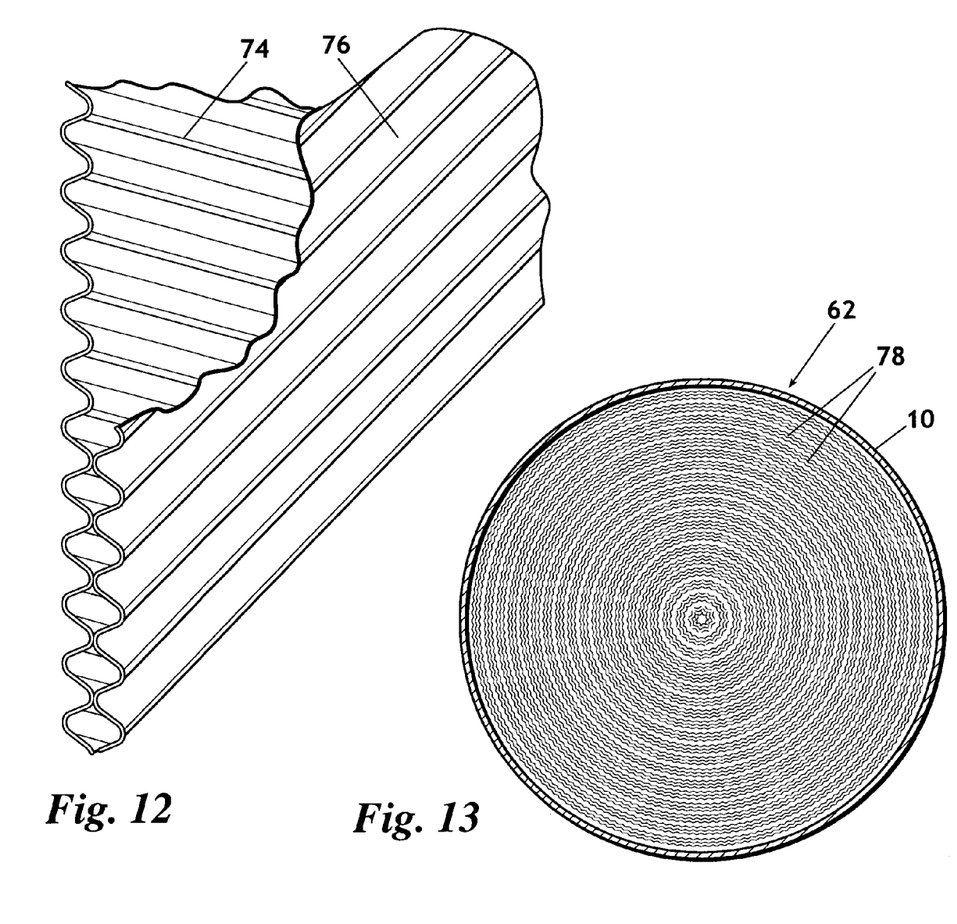
FIG. 12 is an isometric view of two corrugated sheets of coalescing medium placed juxtaposed to each other. The sheets have corrugations of alternate peaks and valleys and in the preferred arrangements the sheets, are oriented so that the corrugations are at an angle relative to horizontal and wherein opposed sheets have corrugations at obverse angles.
FIG. 13 is a cross-sectional view as would be taken horizontally through the coalescence section of the vessel if a spiral or circular array; of coalescent material is employed. The embodiments of FIGS. 12 and 13 are intended to illustrate the coalescence section may include a variety of arrangements that are separately known in the prior art to augment the separation of oil droplets from an oil and water mixture.

FIG. 12 shows an alternate product that may be employed to form the volume of coalescing material between the spaced apart perforated plates or grids. FIG. 12 illustrates spaced apart corrugated sheets of a product called PERFORMAX, a registered trademark of the National Tank Company. The PERFORMAX corrugated shaped coalescing sheets are identified by the numerals 74 and 76. Alternative structured packing material that functions in a manner substantially similar to PERFORMAX may also be used.

In addition to small, discreet objects such as the NATCO-LESCER balls 70 and cylinders 72 in FIGS. 10 and 11, or the PERFORMAX sheets 74 and 76 of FIG. 12, other well known types of coalescing materials may be employed. Corrugated sheets 74 and 76 of FIG. 12 are preferably arranged, as illustrated, so that the corrugations are in planes that are at an angle relative to the horizontal and preferably where the angle of tilt of the corrugations of adjacent plates is obverse to each other.

FIG. 13 shows still another embodiment of a system that can be used to provide the coalescence section 62 within the vessel. In this embodiment, corrugated plastic sheets are arranged in a circular array 78.

The various coalescing devices illustrated in FIGS. 10 through 13 indicate that the method by which coalescence is achieved in section 62 can vary considerably.

Irrespective of the particular devices or structures used to achieve coalescence in the preferred arrangement, the coalescence section 62 functions not only to augment coalescence but to further disperse the oily water mixture flowing downwardly through it to provide a uniform downward flow within the interior of vessel 10.

Figure 2B:
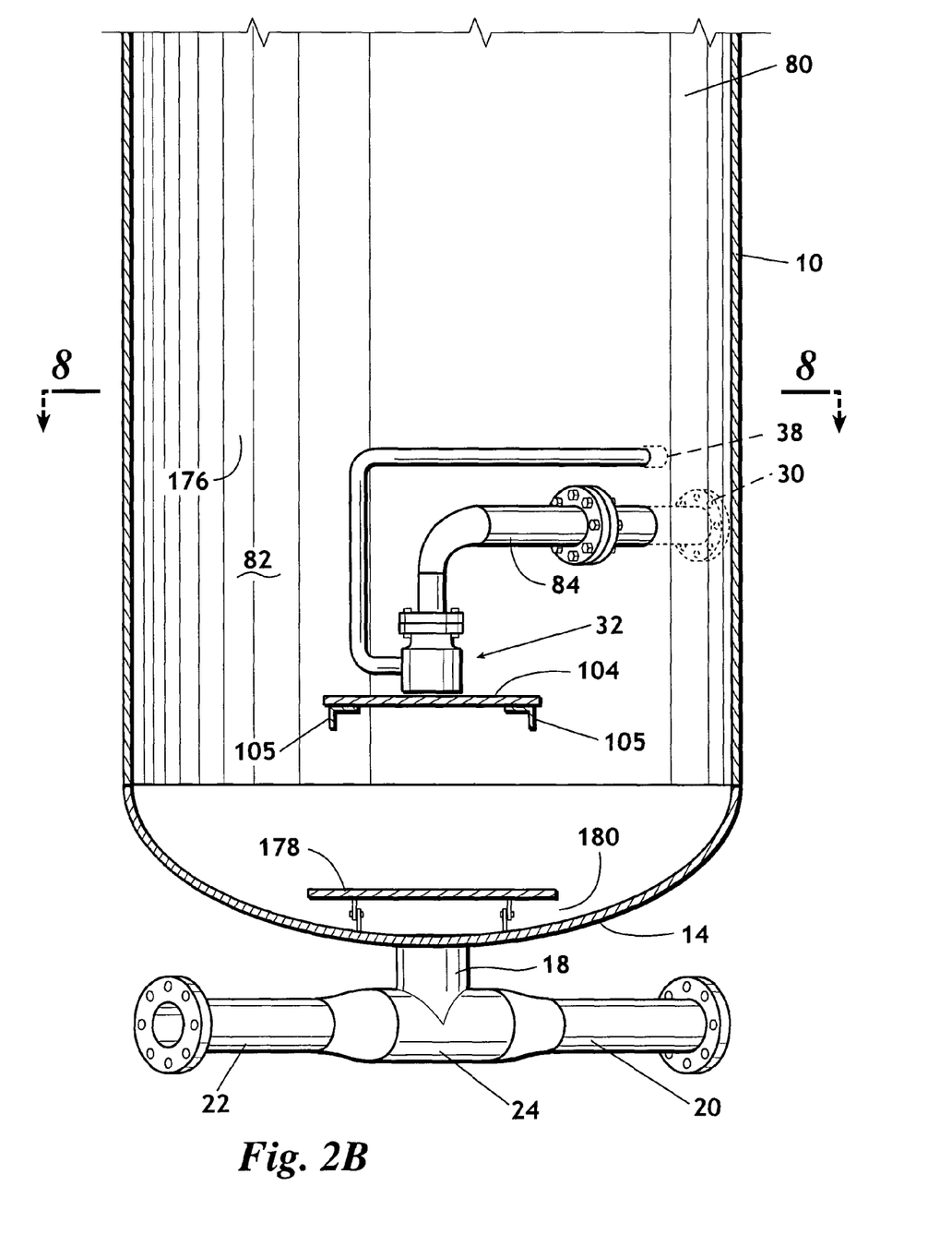
FIG. 2B is an enlarged fragmentary cross-sectional view of the lower portion of the flotation cell of FIG. 1.
Figure 3:
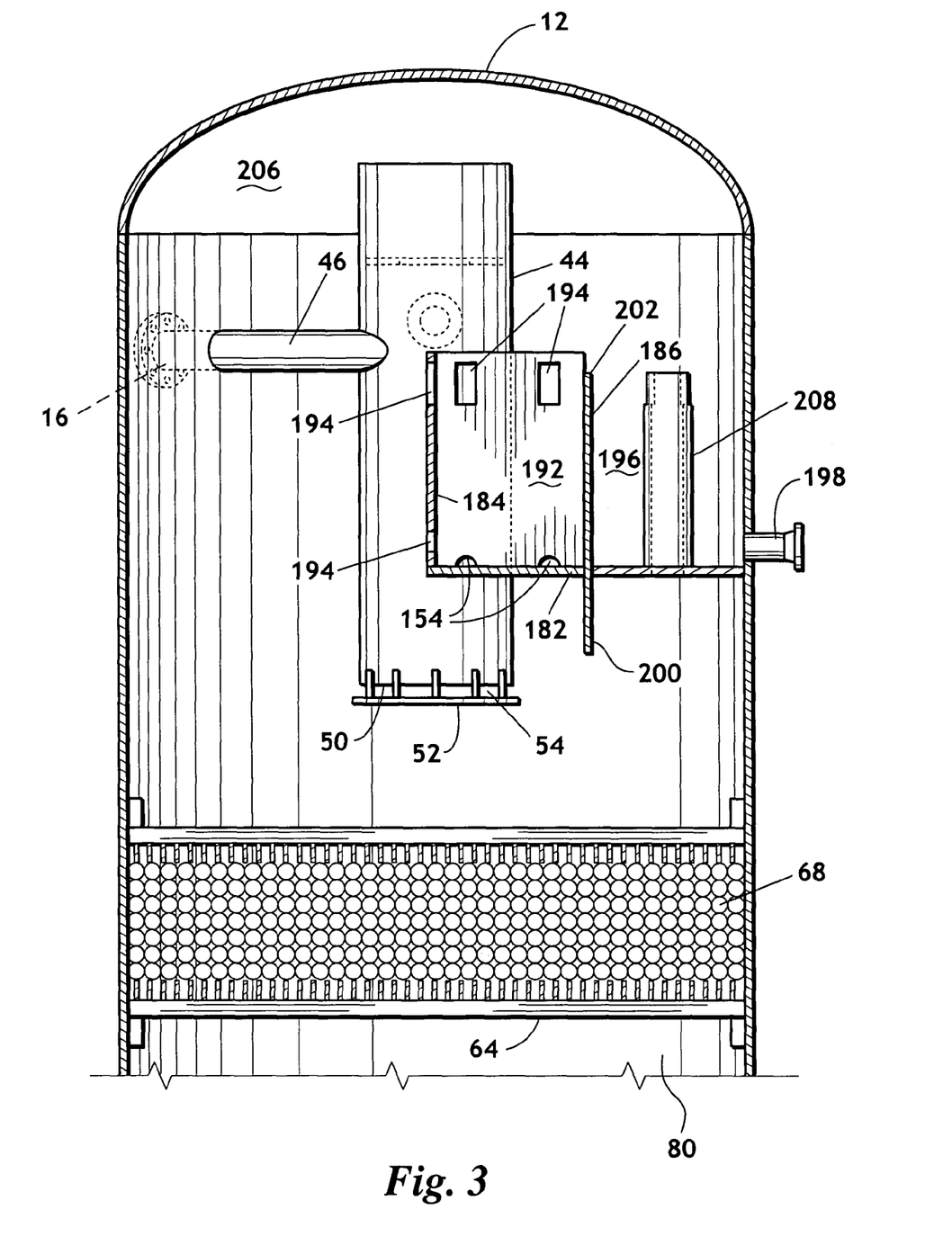
FIG. 3 is an elevational cross-sectional view of an upper portion of the flotation cell as taken along the Line 3—3 of FIG. 2A to better illustrate the relationship between the inlet cyclonic tube and the skim bucket.
Figure 4:
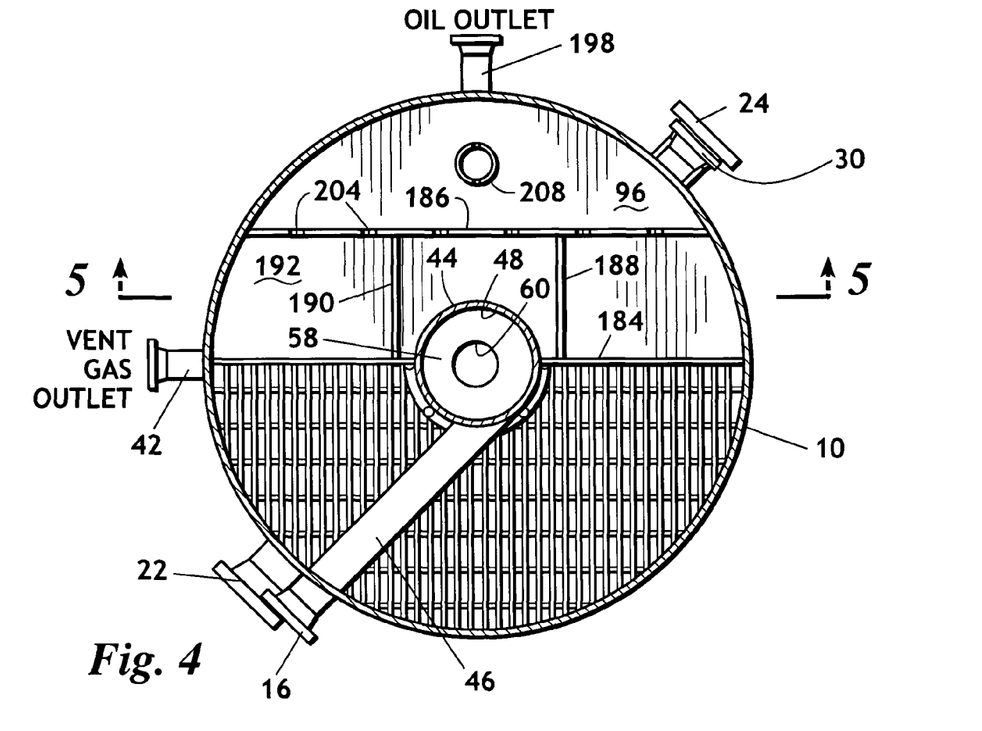
FIG. 4 is a horizontal cross-sectional view of the flotation cell as taken along the Line 4—4 of FIG. 2A. This figure shows the cyclone inlet tube in cross-sectional view and shows a top view of the skim bucket structure.

Below the coalescence section 62 within cell 10 is a flotation chamber 80 as seen in FIGS. 2A, 2B and 3. Flotation chamber, 80 provides a relatively large interior area within the cell where uprising small gas bubbles have an opportunity to adhere to oil droplets suspended in the mixture to enhance the flotation of the oil droplets or other hydrophobic contaminants so that the contaminants with the assistance from gas bubble flotation migrate upwardly towards the upper end of vessel 10 while the water content of the mixture having substantially all of the contaminants separated therefrom migrates downwardly. Vessel 10 is configured so that the average plug flow velocity in flotation chamber 80 is vertically downward at a rate of 1.0 to 3.0 ft/min with about 2.0 ft/min being a preferred rate. The vessel 10 and the size of flotation chamber 80 is preferably dimensioned according to the flow rate of the mixture passing through the cell so that the mixture remains in the flotation chamber 80 from about 2 to 4 minutes with 3 minutes being preferred. A size of flotation chamber 80 outside these ranges will result in a cell that is either uneconomically large or a cell where the downward velocity of the mixture is too fast to permit oil droplets and oil coated solids to be separated from the mixture by rising upwardly against the downward flow.

Figure 9:
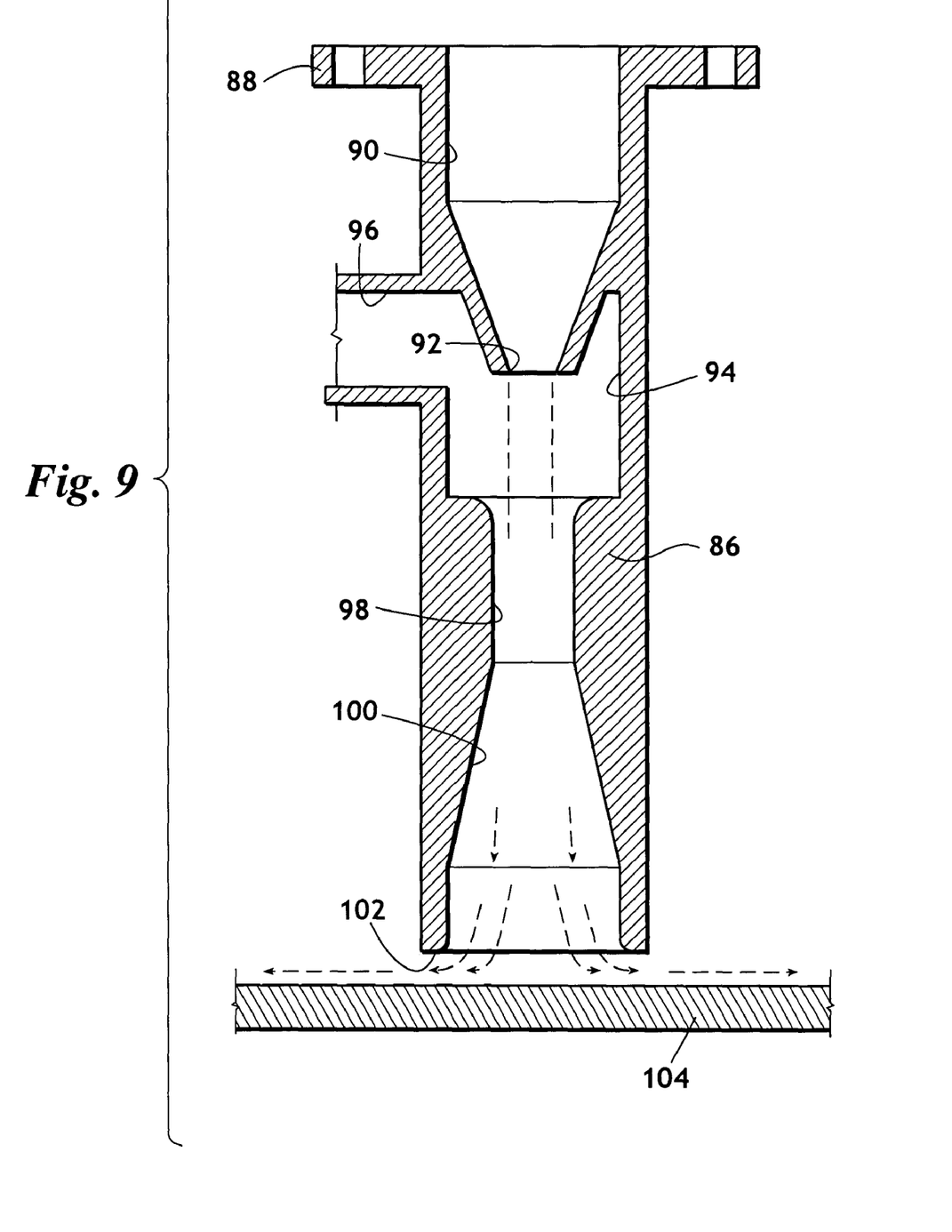
FIG. 9 is an elevational, cross-sectional view of an eductor that may be employed in the vertical gas flotation cell of this invention.

Below the flotation chamber 80 is a gas eductor 32 as previously mentioned and as seen in FIGS. 2B and 9. The eductor has connected to it a water inlet pipe 84 that extends from a recycled water inlet 30 of vessel 10. Eductor 32 also receives interior gas conduit 40 as has been previously described. The function of eductor 32 is to provide at the output thereof aerated water, that is a stream of recycled liquid having gas bubbles therein. Gas eductor 32 is designed to distribute gas bubbles in a substantially uniform manner over the cross-sectional area of a lower portion of the interior of cell 10 so that the gas bubbles are released to migrate upwardly by buoyancy and to adhere to oil droplets and oil coated solids dispersed in the mixture. Typically, the required gas bubbles emanate from eductor 32 having diameters of about 100 to 500 microns with bubbles having 100 to 300 microns in diameter being preferred. Gas bubbles smaller than 100 microns are generally too small to rise against the downward flow of the water in the vessel 10.

By the way of example, an eductor is illustrated in FIG. 9, and indicated by the numeral 86. This eductor has an upper end with a flange 88 providing means for attachment of water inlet pipe 84 (not seen in FIG. 9). Eductor 86 has an open interior at the top that tapers to a reduced diameter jet 92 that communicates with an enlarged internal cavity 94 which communicates with a gas inlet 96 that in turn is connected to gas conduit 40 (not seen in FIG. 9). Below cavity 94 is a reduced internal diameter passageway 98 that in turn communicates with a discharge section 100 that tapers outwardly to discharge end 102.

Eductor 86 functions by the jet action of liquid passing into the open interior 90, through jet 92 and into the venturi formed by the cylindrical passageway 98 and the tapered enlarged discharge section 100. This venturi action draws gas that is intimately mixed in the form of fine bubbles in the recycled or aerated water that is discharged from lower end 102 of the eductor. The gas that is mixed is drawn from the upper end of vessel 10 through recycled gas outlet 34 by way of exterior gas pipe 36. The eductor must generate sufficient vacuum at the exit spacing defined by 102 and 104 that it is capable of drawing in the required 0.3 to 3.0 SCF/BBL of gas despite the static head of water in vessel 10 that will tend to work against this drawing in of gas.

Thus, the eductor as indicated in FIG. 9 functions to provide aerated water having small dispersed gas bubbles that are discharged within the interior of cell 10 so that gas bubbles released can migrate upwardly against the downward flowing mixture within the vessel. As the gas bubbles migrate upwardly they attach to oil droplets and oily coated solids to add flotation so that the oil droplets and oily coated solids float to the upper surface for removal in a manner to be described subsequently.

A horizontal plate 104 is placed at the lower end of eductor 86 to cause the aerated water discharged from the eductor to disperse in a horizontal plane within the lower portion of cell 10. The performance of gas flotation cell 10 is greatly improved by the inclusion of a horizontal discharge eductor as illustrated in FIG. 9.

As previously mentioned, the mixture inlet system is particularly arranged by the use of the inlet cylinder 44 to introduce the mixture into cell 10 so that it is distributed over the whole interior upper area of the cell. Further, the coalescence section 62 improves this uniform distribution of the mixture within the upper portion of the cell so that as the mixture migrates downwardly it is encountered by the upwardly rising widely distributed small bubbles produced by the eductor system. It can be seen that the inlet system obtains a horizontal distribution of the inlet mixture and the eductor system attains a horizontal distribution of aerated water. The combination of these two features produces superior gas flotation cell results.

The size of the gas bubbles produced by eductor 32 are preferably no larger than necessary to have a net average rise velocity that equals or exceeds the net average downward velocity of the mixture within cell 10. Typically, this will require gas bubbles emanating from the eductor to be 100 to 500 microns in initial diameter with about 100 to 300 microns being a preferred size. The volume of gas introduced through eductor 32 should be about 3 to 3.0 SCF per barrel of oily water mixture treated. The preferred gas introduction rate is 5 to 1.0 SCF per barrel of oily water treated. These design parameters are intended only as a guidance in practice of the invention and are not intended to impose limitation on the scope of the invention described herein.

After being cleaned of entrained oil, the resultant water content of the mixture flows downward to bottom outlet 18. In order to receive water from the cell in a disbursed manner and to eliminate any down-coning of produced water to the outlet, a vortex breaker cover plate 178 is provided as seen in FIG. 2B. The cover plate requires a diameter at least two times that of the diameter of water outlet 18 with 3 to 5 times the diameter being preferred. Plate 178 is mounted at a height above the vessel bottom 14 to provide a circumferential slot 180 for water to flow through to outlet 18. The area of the circumferential entrance slot 180 should be at least 2 times the area of exit nozzle 18 with an area of 4 to 5 times being preferred.

Oil and oil-coated solids separated within the flotation cell move towards the cell upper end 12 as augmented by gas flotation. Oil and oily coated solid contaminants accumulate above a mixture level that is above the lower end 50 of inlet cylinder 44—that is, above the level within the vessel in which the mixture is introduced into the vessel interior. On top of the accumulated oil there is an oil/gas interface that is substantially at the maximum oil level which is established by an oil skim bucket system best illustrated in FIGS. 2A, 3, 4, 5 and 6. The skim bucket has a horizontal bottom plate 182, a front vertical plate 184, and a partition vertical plate 186. In addition, vertical divider plates 188 and 190 separate and add stability to vertical front and partition plates 184 and 186. The plurality of plates serve to provide a volume within the vessel where slosh motion of the skimmed oil and water are dampened to permit better oil/water separation and skimming without taking excess water out with the oil. Oil accumulating within the upper interior portion of vessel 10 flows into an area 192 that is between front vertical plate 184 and partition vertical plate 186. Oil can flow into area 192 through upper openings 194 formed in front plate 184. Excess water that is skimmed as a result of slosh motion within the vessel then exits the front flotation chambers 192 through the lower openings 194. In addition, similar openings are provided in the divider plates 188 and 190.

From area 192 floating oil and oil coated-solids can flow into an oil bucket 196 that is defined by partition vertical plate 186 and a portion of the interior cylindrical wall of vessel 10. Oil accumulated within the oil bucket 196 is drained from the vessel through an oil outlet 198 as seen in FIG. 3. The oil outlet 198 is not seen in FIG. 1 since it is on the back side of the vessel. The area 192 between front plate 184 and partition vertical plate 186 forms a slosh area to prevent excess oily water mixture within the vessel being inadvertently spilled over into the oil discharge area 196.

To keep gas bubbles from rising up front face 184 of the skim bucket and thereby inhibiting skimming, intermediate plate 186 has a downward extension 200 as seen best in FIG. 3. This forms a shelf that protects the face of the oil skim bucket from the rising column of gas bubbles. Skimming is further enhanced by the cyclonic motion of the mixture in the cell that results from the mixture inlet as has been described. This cyclonic motion will preferentially move skimmed oil towards the skim bucket face on one half of the cell.

Figure 5:
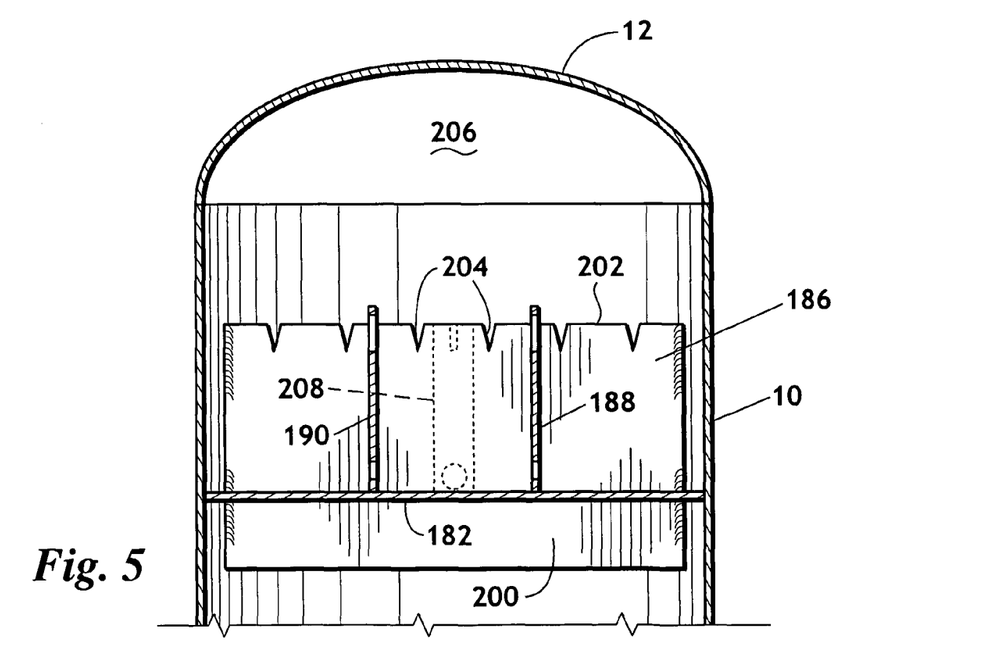
FIG. 5 is a fragmentary elevational view taken along the Line 5—5 of FIG. 4 showing more details of the arrangement of the skim bucket structure.
Figure 6:
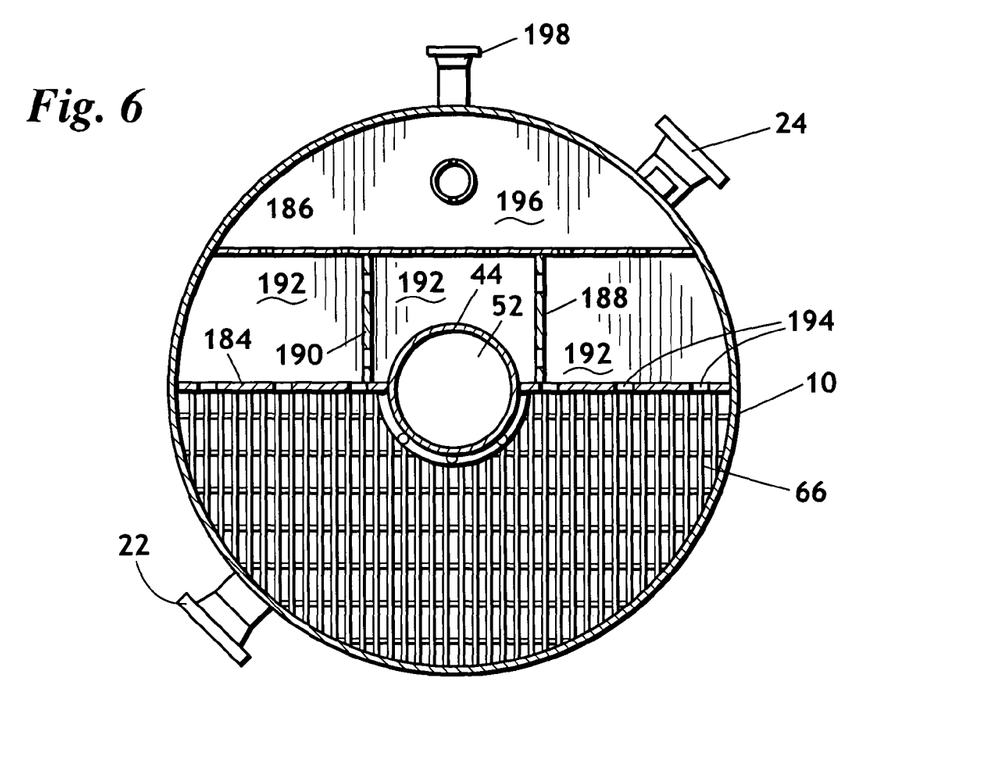
FIG. 6 is a horizontal cross-sectional view of the flotation cell as taken along the Line 6—6 of FIG. 2A, showing more details of the skim bucket structure and a top view of the top grating that retains the coalescing inducing media.
Figure 7:
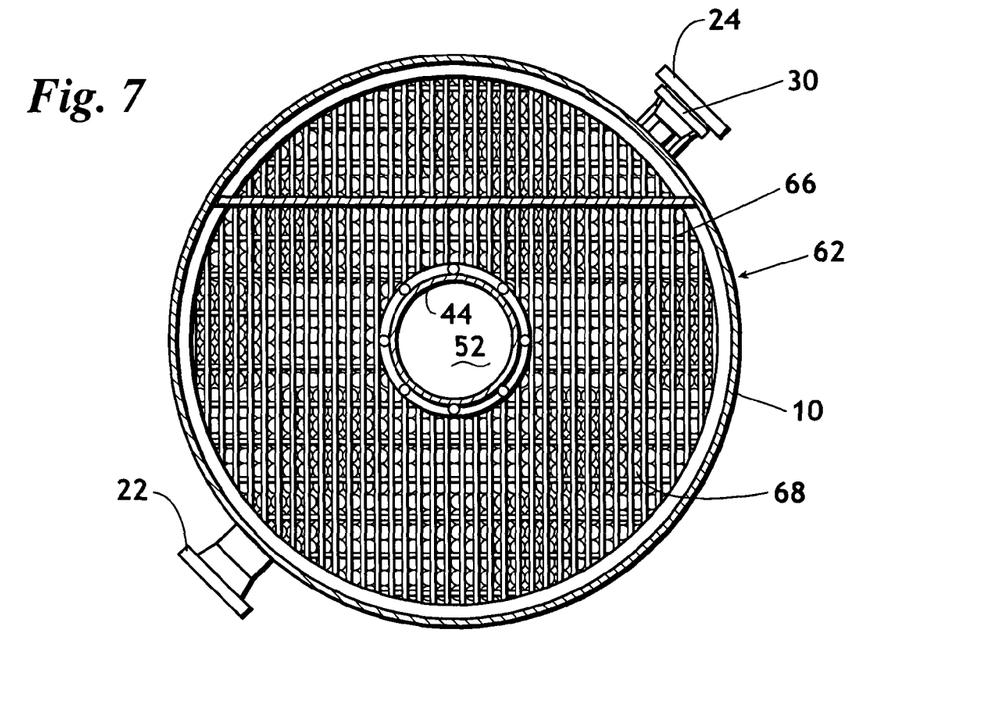
FIG. 7 is a horizontal cross-sectional view taken along the Line 7—7 of FIG. 2A and shows the inlet hydrocyclone tube in cross-section, shows a top view of the top plate of the coalescence section and shows the use of a multitude of small balls providing substantial surface area by which coalescence of oil droplets is augmented.
Figure 8:
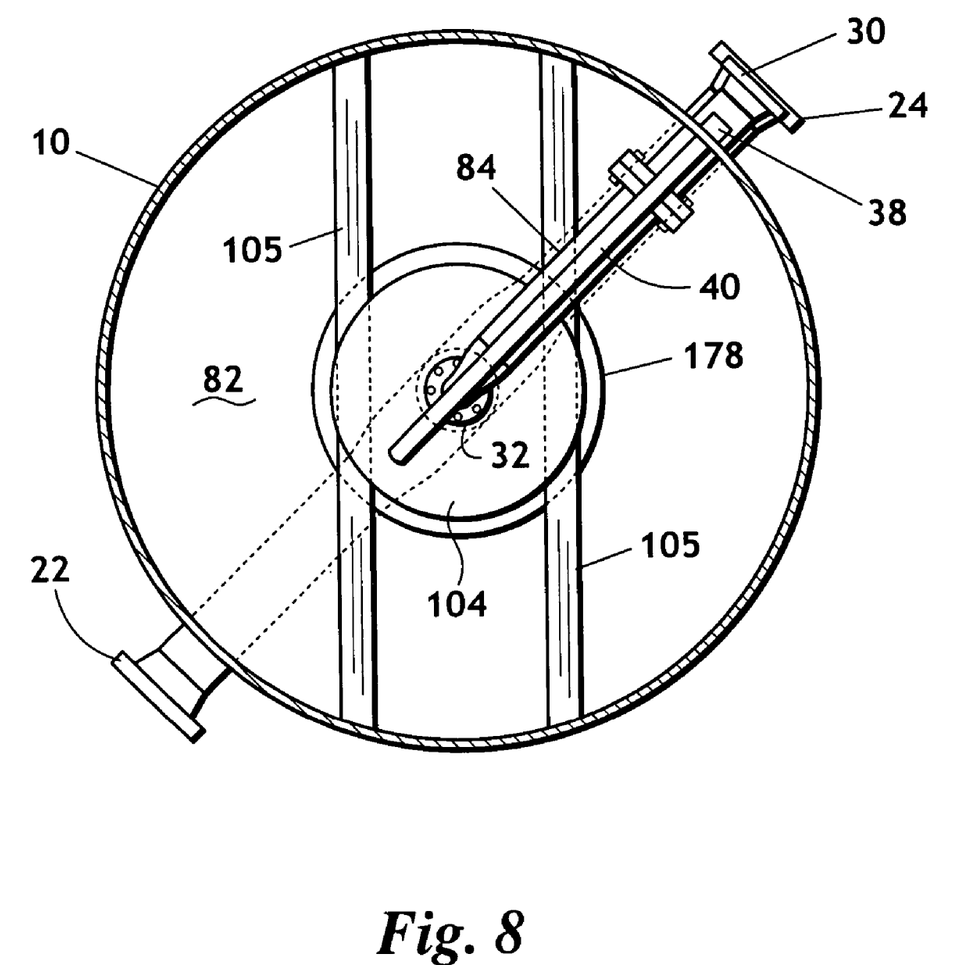
FIG. 8 is a horizontal cross-sectional view of the cell taken along the Line 8—8 of FIG. 2B.

The top edge 202 of partition vertical plate 186 is provided with V-shaped notches 204 as seen in FIGS. 2A and 5. V-shaped notches define the upper fluid level within the vessel as oil that flows through the V-shaped notches 204 is withdrawn through oil discharge 198. The interior area of the vessel above V-shaped notches 204 provides the gas collection chamber 206, recycled gas being withdrawn from chamber 206 through recycle gas outlet 34. Excess gas or vent gas is taken through a separate outlet 42.

As seen in FIGS. 3 and 4, a vertical riser pipe 208 communicates the area below skim bucket bottom plate 182 with gas collection chamber 206 that is above the height of notches 204 formed in the top edge 202 of partition vertical plate 186. In this way, gas that collects between the downward extension 200 of partition vertical plate 186 and the wall of the vessel is vented into the upper gas collection chamber 206. This venting action reduces, the possibility of gas bubbles flowing up the outer wall of the skim bucket to thereby interfere with the skimming action. Any oil or other contaminants trapped under plate 182s and behind wall 200 will be lifted by gas exiting through pipe 208 and discharged directly to the oil bucket 196.

The vertical gas induced separation system of this invention is particularly adaptable for use on floating platforms. More specifically, the arrangement of the skim bucket adapts the cell to be used on ships and platforms that are not stable. The two-stages of skimming are arranged so that the compartments permit limited motion of skimmed contaminants within the separator while reducing the possibility that excessive oily water mixture will be passed into the oil collection bucket 196 for discharge with the oil.

The induced gas flotation cell described herein attains improved performance over other known flotation cells by a preferred combination of the above-described features. This combination results in improved effectiveness of flotation by more widely and uniformly distributing small gas bubbles in a lower portion of a vertical cylindrical separator and at the same time by an improved mixture inlet system that prevents large gas surges from interrupting the performance of the system and that distributes the incoming oily water mixture with fine gas bubbles that are not removed by the inlet cylinder with a uniform and swirling motion within the vessel.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A method of separating oil and/or oily coated solids from a gaseous oily water mixture in an upright vessel having an inlet for introducing gaseous oily water mixture into an upper portion of the vessel, a water outlet in a lower portion of the vessel and an oil outlet, comprising the steps of:
   (a) flowing the gaseous oily water mixture from said vessel inlet tangentially into an upright tubular cyclonic inlet member positioned concentrically within an upper portion of said vessel;
   (b) extracting by cyclonic action, large gas bubbles without extracting small gas bubbles and discharging the inlet mixture of oily water and small gas bubbles in a substantially horizontal pattern to disperse the oily water mixture over substantially all the full cross-sectional area of said vessel;
   (c) flowing pressurized water through an eductor positioned within a lower portion of said vessel, the eductor having a gas inlet connected to a source of gas and an outlet through which ejected water having small gas bubbles entrained therein passes;
   (d) disseminating the ejected water and entrained gas bubbles in a radial substantially horizontal pattern that uniformly disperses the small gas bubbles over substantially the full cross-sectional area of said vessel, the small gas bubbles migrating upwardly to adhere to and add buoyancy to oil and/or oily coated solids;
   (e) skimming separated oil and/or oily coated solids in a top portion of said vessel; and
   (f) discharging the separated oil and/or oily coated solids through said oil outlet.

2. A method according to claim 1, including the step of passing the inlet mixture through a coalescing section positioned between said vessel inlet and said water outlet to promote oil droplet coalescence.

3. A method according to claim 1 in which the step of passing the inlet mixture through a coalescing section includes passing the inlet mixture through a horizontal layer of spaced apart oleophylic elements.

4. A method according to claim 1 wherein gas extracted by said cyclonic inlet member collects within an upper interior portion of said vessel and including the step of passing gas by way of a pipe extending from the vessel upper interior portion to said eductor gas inlet thereby providing said source of gas.

5. A method according to claim 1 including the step of employing a water pump having an inlet in communication with said vessel water outlet and an outlet in communication with said eductor inlet providing said source of pressurized water.

6. A method according to claim 1 including the step of providing pressurized water by means of a pump having an inlet connected to said vessel water outlet and the step of providing a source of gas in the form of a pipe connected to an upper interior portion of said vessel whereby water and gas employed in said eductor are both recycled from within said vessel interior.

7. A method according to claim 1 including the step of providing an eductor in the form of a venturi body having a venturi-forming passageway there through connected at one end to said source of pressurized water, the venturi body having a laterally extending gas inlet opening communicating with said venturi-forming passageway and an eductor outlet end surface that receives said venturi-forming passageway and including the step of horizontally deflecting water from said eductor outlet by which water and small gas bubbles are distributed radially and horizontally into said vessel interior.

8. A method according to claim 1 wherein the step of skimming separated oil and/or oily coated solids includes the use of a two-stage skim bucket.

9. A method of separating oil and/or oily coated solids from an oily water mixture in an upright vessel, including the steps of:
   flowing the oily water mixture tangentially into an upright cyclone inlet member positioned concentrically within an upper portion of the vessel and extracting by cyclonic action large gas bubbles without extracting small gas bubbles from the mixture;
   deflecting the oily water mixture containing said small gas bubbles from said cyclone inlet member in a horizontal pattern over substantially the full cross-sectional area of an upper portion of the vessel;
   pumping water under pressure through an eductor having a source of gas to provide water having small gas bubbles infused therein;
   distributing water having small gas bubbles infused therein from the eductor in a substantially horizontal pattern over substantially the full cross-section area of a lower portion of the vessel, bubbles from the water migrating upwardly and attaching to oil droplets and oily coated solids augmenting the buoyancy thereof, enhancing oil and oily coated solids separation; and
   withdrawing oil and oily coated solids from an upper portion and cleaned water from a lower portion of the vessel.

10. A method of separating oil and/or oily coated solids from an oily water mixture according to claim 9 wherein said vessel has a water collecting area in a lower portion therein and including the step of extracting water from said vessel lower portion to provide water as employed in step (b).

11. A method of separating oil and/or oily coated solids from an oily water mixture according to claim 9 including the step of skimming oil and oily coated solids from an upper portion of the vessel employing a two stage skim bucket.

12. A method of separating oil and/or oily water coated solids from an oily water mixture according to claim 9 including the steps of passing both the down flowing oily water mixture and the upwardly migrating bubbles through a coalescing section formed by a horizontal layer of oleophylic elements.

13. A method according to claim 9 wherein the oily water mixture has an average vertically downward flow velocity of about two feet per minute.

14. A method according to claim 9 wherein the step of discharging the inlet mixture in a substantially horizontal pattern includes discharging the inlet mixture with a cyclonic motion in an upper portion of the vessel.

15. A method according to claim 9 wherein a substantial portion of said small gas bubbles entrained in the water ejected from said eductor are of about 100 to 500 microns in initial diameter.

16. A method according to claim 9 in which said eductor introduces gas in the form of bubbles into said oily water mixture at a rate of about 0.3 to 3.0 standard cubic feet of gas per barrel of oily water passing into said vessel.

17. A method according to claim 9 in which said eductor introduces gas in the form of bubbles into said oily water mixture at a rate of about 0.5 to 1.0 standard cubic feet of gas per barrel of oily water passing into said vessel.

\* \* \* \* \*